United States Patent [19]

Sheridon et al.

[11] Patent Number: 4,743,925

[45] Date of Patent: May 10, 1988

[54] MODULATION ELECTRODES HAVING IMPROVED CORROSION RESISTANCE

[75] Inventors: Nicholas K. Sheridon, Saratoga; Henry W. Sang, Jr., Santa Clara, both of Calif.

[73] Assignee: Xerox Corporation, Stamford, Conn.

[21] Appl. No.: 42,128

[22] Filed: Apr. 24, 1987

[51] Int. Cl.[4] .............................................. G01D 15/00

[52] U.S. Cl. ...................................... 346/159; 346/155

[58] Field of Search .................... 346/155, 159, 139 C, 346/162–164; 400/119; 101/DIG. 13; 219/543; 358/300; 428/901; 252/508, 500, 512

[56] References Cited

U.S. PATENT DOCUMENTS 4,584,592 4/1986 Tuan et al. .......................... 346/155

4,646,163 2/1987 Tuan et al. .......................... 346/155

*Primary Examiner*—Arthur G. Evans

*Attorney, Agent, or Firm*—Serge Abend

[57] ABSTRACT

A marking array for use in an ionographic printer in which the transport fluid entrained ions presents a highly corrosive atmosphere to the modulation electrodes. Marking electrodes formed of an alloy of aluminum and copper wherein the copper is in the range of 0.5 to 4% exhibit a remarkably extended lifetime over unalloyed aluminum electrode.

8 Claims, 3 Drawing Sheets

MODULATION ELECTRODES HAVING IMPROVED CORROSION RESISTANCE

FIELD OF THE INVENTION

This invention relates to improvements in the marking array of an ionographic marking apparatus and, in particular, to improved modulation electrodes having extended lifetimes.

BACKGROUND OF THE INVENTION

In commonly assigned U.S. Pat. No. 4,584,592 issued on Apr. 22, 1986 in the names of Hsing C. Tuan and Malcolm J. Thompson entitled, "Marking Head For Fluid Jet Assisted Ion Projection Imaging Systems", there is disclosed a marking array for use in conjunction with the marking head of an ion projection printer of the type disclosed in commonly assigned U.S. Pat. No. 4,463,363 issued on July 31, 1984 in the names of Robert W. Gundlach and Richard L. Bergen, entitled, "Fluid Jet Assisted Ion Projection Printing". In that printer, an imaging charge is placed upon a moving receptor sheet, such as paper, by means of a linear array of closely spaced minute air streams. Charged particles, comprising ions of a single polarity (preferably positive), are generated in an ionization chamber of the marking head by a high voltage corona discharge and are then transported to and through the exit region of the marking head, where they are electrically controlled at each image pixel point, by an electrical potential applied to a modulating electrode. Selective control of the modulating electrodes in the array will enable spots of charge and absence of charge to be recorded on the receptor sheet for subsequent development.

A large area marking head for a page-width line printer would typically measure about 8.5 inches wide. A high resolution marking array capable of printing 200 to 400 spots per inch would, therefore, include about 1700 to 3400 conductive metallic modulation electrodes. The entire array measuring on the order of 8.5 inches by 0.7 inches also would include a multiplexed addressing assembly comprising metallic address lines and data lines and amorphous silicon thin film active switching elements. All of these elements would be fabricated upon a single low cost substrate, such as glass.

During the operation of such an ionographic printer there is an outflow of corrosive agents from the ionization chamber. These agents have a propensity to attack the exposed metallic modulation electrodes very rapidly, thereby lowering the operational lifetime of the marking array. Heretofore, the modulation electrodes have been fabricated of inexpensive electrically conductive materials which are compatible with standard thin film deposition techniques and which may be also used for conductive lines and for contacts with the active devices. Typically, this material has been aluminum. It has been observed that aluminum modulation electrodes oxidize rapidly, resulting first in changed electrical characteristics since the aluminum oxide is insulating and not conductive, and finally in catastrophic electrical and mechanical failure as the electrodes are fully converted to the brittle insulating oxide which flakes off the substrate. An inert material, such as gold, has yielded extremely corrosion resistant electrodes but its cost and non-compatibility with the marking head fabrication process has negated its practical use. In a copending patent application, filed concurrently herewith, entitled "Marking Array Having Improved Corrosion Resistance" in the names of Nicholas K, Sheridon and Henry Sang Jr. now U.S. Pat. No. 4,727,388, there is disclosed a manner of operating a marking array of an ionographic apparatus so that it has improved corrosion resistance in the ionographic environment.

Therefore, it is the primary object of this invention to provide a marking array having an extended lifetime by comprising modulation electrodes made of a material substantially more resistive to the corrosive effluents of the ionographic process than are the known aluminum electrodes.

Additionally, it is an object to provide modulation electrodes made of a material which oxidizes at a slower rate than the known aluminum electrodes for improving grey scale control over the lifetime of the marking apparatus.

It is yet another object of this invention to provide a material which is inexpensive and which is compatible with the marking head structure and fabrication process.

SUMMARY OF THE INVENTION

The present invention may be carried out, in one form, by providing an improved ion modulation structure for an ionographic printer wherein the modulation structure comprises a marking array including a substrate upon which is integrally fabricated modulation electrodes, data buses, address buses and active thin film switches and the modulation electrcde comprise an alloy of aluminum and copper, the copper being in the range of 0.5% to 4%.

BRIEF DESCRIPTION OF DRAWINGS

Other objects and further features and advantages of this invention will be apparent from the following, more particular, description considered together with the accompanying drawings, wherein.

DETAILED DESCRIPTION OF THE PREFERRED EMBODIMENTS

Figure 1:
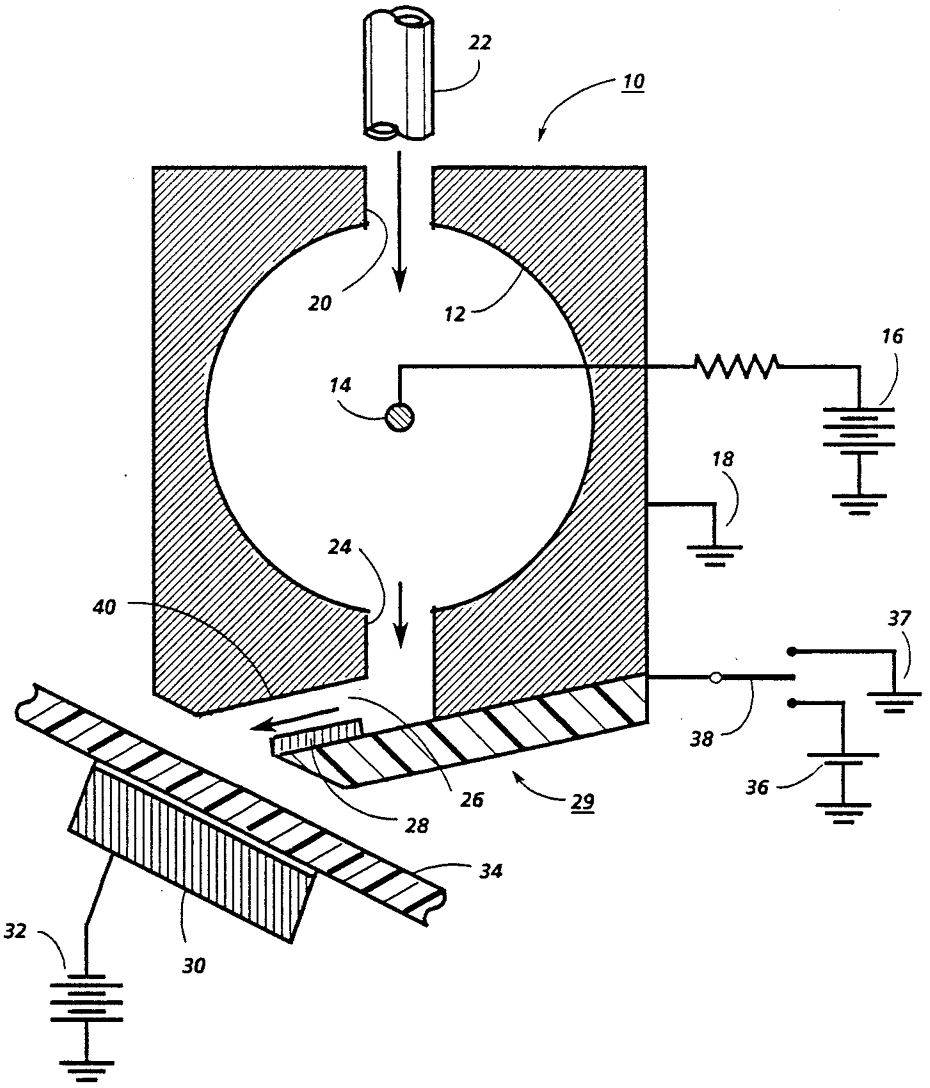
FIG. 1 is a partial cross-sectional elevation view showing the marking head of a fluid jet assisted ion projection printing apparatus.

With particular reference to the drawings, there is illustrated in FIG. 1 a schematic representation of the marking head 10 of a fluid jet assisted ionographic printing apparatus. Although a more representative embodiment of the present state of the marking head is described in commonly assigned U.S. Pat. No. 4,644,373 issued on Feb. 17, 1987, in the names of Nicholas K. Sheridon and Gerhard K. Sander, and entitled "Fluid Assisted Ion Projection Printing Head", the following description is based on the schematic FIG. 1 form.

Within the housing 10 is an ion generation region including an electrically conductive chamber 12, a corona wire 14 extending substantially coaxially in the chamber, a high potential source 16, on the order of several thousand volts DC, applied to the wire 14, and a reference potential source 18, such as ground, connected to the wall of chamber 12. The corona discharge around the wire creates a source of ions, of a given polarity (preferably positive), which are attracted to the grounded chamber wall and fill the chamber with a space charge.

An axially extending inlet channel 20 delivers pressurized transport fluid (preferably air) into the chamber 12 from a suitable source, schematically illustrated by the tube 22. An axially extending outlet channel 24 conducts the transport fluid from the corona chamber 12 to the exterior of the housing 10, past an ion modulation region 26. As the transport fluid passes through and exits the chamber 12, through outlet channel 24, it entrains a number of ions and moves them into the ion modulation region 26, past ion modulation electrodes 28, on the marking array 29.

Ions allowed to pass completely through and out of the housing 10, through the outlet channel 24, come under the influence of accelerating back electrode 30 which is connected to a high potential source 32, on the order of several thousand volts DC, of a sign opposite to that of the corona source 16. A charge receptor 34 moves over the back electrode 30 and collects the ions upon its surface. Subsequently the latent image charge pattern may be made visible by suitable development apparatus (not shown). Alternatively, a transfer system may be employed, wherein the charge pattern is applied to an insulating intermediate material, such as the dielectric surface of a conductive drum or belt. In such a case, the latent image charge pattern may be made visible by development upon the drum or belt surface and subsequently transferred to an image receptor sheet.

Once the ions have been swept into the outlet channel 24 by the transport fluid, it becomes necessary to render the ion-laden fluid stream intelligible. This is accomplished in the modulation region by individually switching the modulation electrodes 28, between a low voltage source 36 (on the order of ten to twenty volts DC) and a reference potential 37 (which may be ground) by means of a switch 38. The modulation electrode 28 and the grounded opposite wall 40, which bridge the gap across the outlet channel, comprise a capacitor, across which the low voltage potential of source 36, may be applied, when connected through switch 38. Thus, an electric field, extending in a direction transverse to the direction of the transport fluid flow, is selectively established between a given modulation electrode 28 and the grounded opposite wall 40.

"Writing" of a selected spot is accomplished by connecting a modulation electrode to the reference potential source 37, held at about 0 volts, so that the ion "beam", passing between the electrode and its opposite wall, will not be under the influence of a field therebetween and transport fluid exiting from the ion projector, in that "beam" zone, will carry the "writing" ions to accumulate on the desired spot of the image receptor sheet. Conversely, no "writing" will be effected when the modulation electric field is applied to an electrode. This is accomplished by closing switch 38 and applying the low voltage potential of source 36, on the order of about 10 to 20 volts, to the electrode 28 in order to impose upon the electrode a charge of the same sign as the ionic species. The ion "beam" will be repelled and driven into contact with the opposite, electrically grounded, conductive wall 40 where the ions recombine into uncharged, or neutral air molecules. Thus, an image-wise pattern of information is formed by selectively controlling each of the modulation electrodes on the marking array so that the ion "beams" associated therewith either exit or are inhibited from exiting the housing, as desired.

Figure 3:
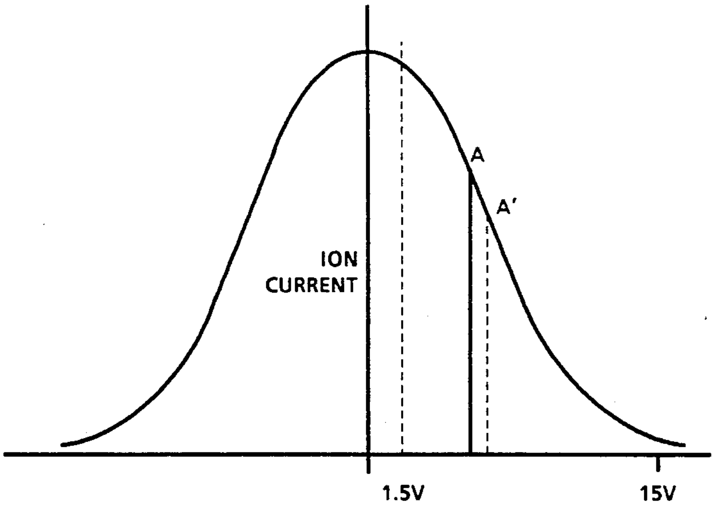
FIG. 3 is a transconductance curve for the modulation electrodes.

To record high quality pictorial information it is not sufficient to "write" in a binary manner (ON or OFF, black or white) and "writing" with a grey scale is desired. Referring to the transconductance curve of FIG. 3 it can be seen that there is a bell-shaped profile to the relationship between the modulation voltage and the ion output current. At very small and very large modulation voltages, the peak and the tail of the curve, the ion current will be ON and OFF, respectively, over a larger latitude of modulation voltage levels, owing to the relative flatness of these regions of the curve. In the steeply curved portion, variations in the modulation voltage will have a greater effect on the ion output current. It is in this section of the curve that multiple levels of grey are "written". Application of different potential values to the modulation electrodes enables control of the ion output in proportion to applied potential. Therefore, it should be recognized that grey scale printing is dependent upon accurate control of the voltage applied to each electrode, for each desired value. However, it has been observed that when an oxide layer builds up on the modulation electrodes, ions passing through the modulation region will tend to accumulate thereon. Since the accumulated bias does not dissipate rapidly, it will have an adverse effect on accurate control of the actual bias applied to the electrodes because the actual charge will be the sum of the applied charge (desired) and the accumulated charge (residual). Looking at the transconductance curve of FIG. 3, if it is desired to "write" a grey level A with a given electrode, and that electrode had previously been "writing" black or a darker level of grey, at which more ions flowed through the modulation region, some ion accumulation will result and the grey level A' will be "written".

Figure 2:
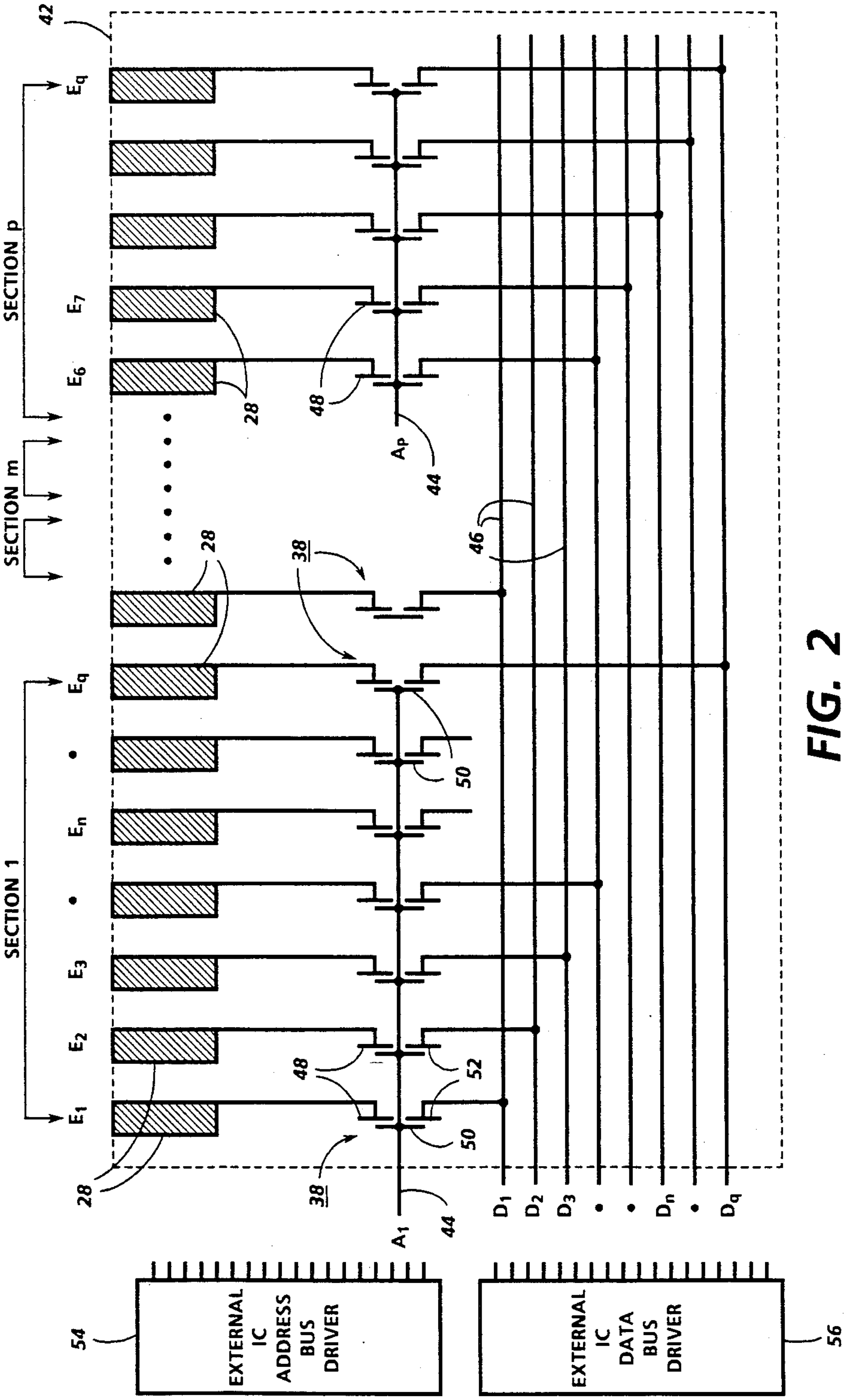
FIG. 2 is a schematic representation of the marking array used in the FIG. 1 device.

The marking array 29 comprises a large area substrate 42 (represented by the dotted outline in FIG. 2) along one edge of which are formed an array of modulation electrodes (E) 28, a multiplexed data entry or loading circuit, comprising a small number of address bus lines (A) 44 and data bus lines (D) 46, and thin film switching elements 33, one for each electrode. With this array it is possible to directly address each electrode with only the small number of wire bonds needed to interface the electrodes with the external driver circuits 54 and 56.

For simplicity and economy of fabrication over the large area, full page-width head, thin film techniques are used. The switches 38 are preferably amorphous silicon transistors (a-Si:H TFTs), although other materials such as polycrystalline Si, laser annealed Si, CdS, Te, or ZnO may be used. As shown, each modulation electrode 28 is connected to the drain electrode 48 of the thin film transistor by a conductive trace, an address bus line 44 is connected to the gate electrode 50, and a data bus line 46 is connected to the source electrode 52. The low temperature a-Si:H fabrication process allows a large degree of freedom in the choice of substrate materials, enabling the use of inexpensive amorphous materials such as glass, ceramics and possibly some printed circuit board materials. Preferably, the substrate is glass and the modulating electrodes, the address and data buses are aluminum. Aluminum is the material of choice because it is compatible with the a-Si:H processing and makes good contacts with the source, drain and gate electrodes of the a-Si:H TFTs.

However, the aluminum modulation electrodes have been found to oxidize rapidly when used in the ionographic process because they are subjected to the corrosive effluents from the corona chamber 12. Since the other aluminum elements are protected and are not contacted by the effluents they are unaffected. It is the purpose of this invention to retain the above-stated benefits of aluminum as the marking array material of choice while extending the lifetime of the modulation electrodes in the corrosive atmosphere.

We have found that in addition to the ions created by the corona discharge within the chamber 12, there is also ozone, and numerous oxides of nitrogen ($N_2O$, $NO_2$, NO) as well as the excited states of these gases which are far more corrosive than their non-activated states. In higher humidity conditions, where water is available, acids of nitrogen are also present. It is likely that the corrosive action is caused by the combined action of the ions and the gases. For example, it is believed that the gas molecules (i.e. ozone and nitrous oxide) initially blanket the surface of the electrodes, but it is not until the ions, moving in the air stream, collide with the surface and displace electrons from the metal that the surface is susceptible to react with the gases blanketed thereon. Then the electrode surface is rapidly oxidized. We have observed that in about 100 hours the highly corrosive atmosphere completely oxidizes the 1 to 2 micron thick aluminum electrodes. In that inordinately short time the aluminum electrodes embrittle and flake off of the substrate due to the stresses created by the expansion of the aluminum oxide.

Short of the catastrophic electrical failure brought about by the complete oxidation of the modulation electrodes we have also observed a fall-off in grey scale control as oxidation progresses. This phenomenon occurs as an insulating layer of oxide is built up on the electrodes. The insulating layer accumulates charge thereon, so that the net effect of the switching potential imposed on the electrodes is lessened and the accurate control needed for multiple levels of grey is subverted.

Our invention relates to alloying a small amount of copper with the aluminum so that corrosion of the modulation electrodes may be inhibited to a striking degree, while the processing and operational characteristics of all the metallic elements are virtually unaffected. With an alloy of aluminum-copper comprising 0.5% copper, a modulation electrode lifetime of about 500 hours was observed before the occurrence of catastrophic failure. An alloy of aluminum-copper comprising 2% copper resulted in a lifetime of greater than 1000 hours. In fact, after 1000 hours of operation at room temperature (about 70° F.) and room humidity (about 50% RH) the surface of the electrodes was observed to have formed some bubbles and cracks thereon but was still operational. In comparison, the same bubbling and cracking was observed, under the same conditions, in the pure aluminum electrodes at about 75 hours. This difference of greater than an order of magnitude increase in lifetime is dramatic.

We believe that practical improvement of the aluminum-copper alloy will continue to occur up to a copper content of about 4%. Beyond that, while there may still be some lifetime improvement, the processing of aluminum with a high copper content is expected to vary appreciably from standard thin film techniques and would require undesired modifications, for example in the etching process. Also, it is known that at higher percentages of copper, on the order of 5%, the copper will segregate out of the aluminum-copper alloy. As the copper rises to the surface of the alloy, the electronic properties would be different and may adversely affect the printing process.

Although the mechanism resulting in protection from oxidation in the corrosive atmosphere is not fully understood, we attribute the improvement to the copper "stuffing" the aluminum grain boundaries. The copper probably gets between the individual grains to act as a "mortar" to stop the imigration of oxygen through the material. Only enough copper is needed to perform this function without affecting any of the other properties of the otherwise satisfactory pure aluminum electrodes.

We have provided an improvement in the modulation structure of the marking head of an ionographic marking apparatus for increasing the effective lifetime of the modulation electrodes in the highly corrosive atmosphere of such a device. Additionally, by inhibiting the rate of oxidation of the electrodes, more accurate control of the potential applied to them may be achieved over a longer period of time, thus improving grey scale control.

What is claimed is:

1. A marking array for use with a marking apparatus, said marking array comprising an electrically insulating substrate upon which are formed a plurality of active semiconductor devices, a plurality of marking electrodes, and electrically conductive metallic lines for interconnecting input signals to said marking electrodes via said active semiconductor devices, the improvement characterized in that said marking electrodes are formed of an alloy of aluminum and copper, and wherein said copper is in the range of 0.5–4%.

2. The marking array as recited in claim 1 characterized in that said metallic lines are formed of the same alloy as are said marking electrodes.

3. The marking array as recited in claim 1 characterized in that all said elements disposed upon said substrate are formed by thin film fabrication techniques.

4. The marking array as recited in claim 2 characterized in that all said elements disposed upon said substrate are formed by thin film fabrication techniques.

5. An ionographic marking head comprising an ion generation chamber, means for introducing a transport fluid to said chamber, an outlet channel for passing transport fluid and ions entrained therein out of said marking head, said effluent being highly corrosive, and a plurality of marking electrodes supported on said marking head adjacent said outlet channel for controlling the outflow of ions from said marking head, the improvement characterized in that said marking electrodes are formed of an alloy of aluminum and copper, and wherein said copper is in the range of 0.5–4%.

6. The marking array as recited in claim 5 characterized in that said marking electrodes are formed upon an electrically insulating substrate upon which are also formed a plurality of active semiconductor devices and electrically conductive metallic lines for interconnecting input signals to said marking electrodes via said active semiconductor devices and said metallic lines are formed of the same alloy as are said marking electrodes.

7. The marking array as recited in claim 6 characterized in that all said elements disposed upon said substrate are formed by thin film fabrication techniques.

8. A method of marking by means of an ionographic process comprising the steps of providing an ion generator, moving ions produced by said ion generator with a transport fluid, providing an ion control region, providing marking electrodes for modulating the flow of said ions through said ion control region, said transport fluid and ions traveling therewith comprising an atmosphere highly corrosive to marking electrodes, the improvement characterized in that said step of providing marking electrodes comprises forming said electrodes of an alloy of aluminum and copper, and wherein said copper is in the range of 0.5–4%.

* * * * *